US009370865B1

(12) United States Patent
Vangal-Ramamurthy et al.

(10) Patent No.: US 9,370,865 B1
(45) Date of Patent: Jun. 21, 2016

(54) FLEXURE BASED COMPLIANCE DEVICE FOR USE WITH AN ASSEMBLY DEVICE

(75) Inventors: Jambunathan Vangal-Ramamurthy, San Jose, CA (US); Rahool Vasudevan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 417 days.

(21) Appl. No.: 13/478,938

(22) Filed: May 23, 2012

(51) Int. Cl.
| | |
|---|---|
| B25B 1/10 | (2006.01) |
| B23P 19/02 | (2006.01) |
| B23P 11/00 | (2006.01) |
| B25B 5/00 | (2006.01) |
| B25H 1/00 | (2006.01) |
| F16B 4/00 | (2006.01) |
| B23P 19/12 | (2006.01) |
| B25J 15/00 | (2006.01) |
| B25J 15/10 | (2006.01) |
| B25J 9/16 | (2006.01) |
| B25J 15/04 | (2006.01) |
| B25J 17/02 | (2006.01) |
| B25B 1/24 | (2006.01) |

(52) U.S. Cl.
CPC .............. *B25J 15/04* (2013.01); *B23P 11/00* (2013.01); *B23P 19/02* (2013.01); *B25B 1/103* (2013.01); *B25B 1/2478* (2013.01); *B25B 5/006* (2013.01); *B25H 1/00* (2013.01); *B25J 15/0019* (2013.01); *B25J 15/103* (2013.01); *B25J 17/0208* (2013.01); *F16B 4/004* (2013.01); *Y10T 29/49609* (2015.01); *Y10T 29/49615* (2015.01); *Y10T 29/49943* (2015.01); *Y10T 29/49945* (2015.01); *Y10T 29/49947* (2015.01)

(58) Field of Classification Search
CPC ........ B23P 19/02; B23P 11/00; B23P 19/102; B23P 19/12; F16B 4/004; B25B 1/103; B25B 1/2478; B25B 5/006; B25H 1/00; B25J 17/0208; B25J 17/0225; B25J 15/04; B25J 15/0019; B25J 15/103; B25J 9/1612
USPC ......... 29/525–525.03, 525.11, 896.9, 896.93; 74/471 XY; 269/43, 55, 60, 71, 75; 901/45, 41, 31; 267/151, 158, 160
See application file for complete search history.

(56) References Cited

U.S. PATENT DOCUMENTS

| | | | | |
|---|---|---|---|---|
| 3,310,792 | A | * | 3/1967 | Groom et al. .............. 360/246.6 |
| 3,527,062 | A | * | 9/1970 | Bilinski et al. ................. 464/78 |
| 3,581,298 | A | * | 5/1971 | Billawala ................... 360/245.6 |
| 3,582,920 | A | * | 6/1971 | Billawala ................... 360/245.6 |
| 3,668,668 | A | * | 6/1972 | Robitschek ................. 360/234.6 |
| 3,700,291 | A | * | 10/1972 | Hadland ......................... 403/291 |
| 3,824,674 | A | * | 7/1974 | Inoyama et al. ............ 29/407.05 |

(Continued)

OTHER PUBLICATIONS

Yeh et al.; Digital closed-loop nanopositioning using rectilinear flexure stage and laser interferometry; Jun. 7, 2004; Control Engineering Practice; 13; pp. 559-566.*

*Primary Examiner* — Moshe Wilensky
*Assistant Examiner* — Bayan Salone

(57) ABSTRACT

Disclosed is a flexure based compliance device for use with an assembly device in an assembly process to assemble a device. The flexure based compliance device comprises: a coupling section configured for coupling to the assembly device; and a pair of double compound rectilinear flexures configured for coupling to the coupling section. The pair of double compound rectilinear flexures provide both axial and translational compliance to the assembly device in the assembly process.

18 Claims, 7 Drawing Sheets

(56) References Cited

U.S. PATENT DOCUMENTS

| | | | | |
|---|---|---|---|---|
| 3,943,778 A * | 3/1976 | Wyse | | 74/5 F |
| 3,952,980 A * | 4/1976 | Von Pragenau et al. | | 248/636 |
| 4,098,001 A * | 7/1978 | Watson | | 33/644 |
| 4,155,169 A * | 5/1979 | Drake et al. | | 33/644 |
| 4,213,707 A * | 7/1980 | Evans, Jr. | | 356/640 |
| 4,245,267 A * | 1/1981 | Herman | | 360/246.6 |
| 4,286,370 A * | 9/1981 | Craig | | 29/434 |
| 4,439,926 A * | 4/1984 | Whitney et al. | | 267/150 |
| 4,537,557 A * | 8/1985 | Whitney | | 414/735 |
| 4,559,717 A * | 12/1985 | Scire et al. | | 33/568 |
| 4,610,473 A * | 9/1986 | Hawkswell | | 294/183 |
| 4,667,415 A * | 5/1987 | Barsky | | 33/568 |
| 4,686,440 A * | 8/1987 | Hatamura et al. | | 318/646 |
| 4,791,588 A * | 12/1988 | Onda et al. | | 700/260 |
| 4,800,802 A * | 1/1989 | Rebman | | 92/61 |
| 4,888,878 A * | 12/1989 | Nagasawa et al. | | 33/573 |
| 4,920,660 A * | 5/1990 | Nagasawa et al. | | 33/568 |
| 4,921,396 A * | 5/1990 | Asakawa et al. | | 414/751.1 |
| 4,991,045 A * | 2/1991 | Oberg | | 360/244.3 |
| 4,991,309 A * | 2/1991 | Nagasawa et al. | | 33/568 |
| 5,005,298 A * | 4/1991 | Nagasawa et al. | | 33/573 |
| 5,185,683 A * | 2/1993 | Oberg et al. | | 360/244.6 |
| 5,207,554 A * | 5/1993 | Asakawa et al. | | 414/744.6 |
| 5,292,211 A * | 3/1994 | Takei | | 408/91 |
| 5,704,106 A * | 1/1998 | Sampson et al. | | 29/450 |
| 5,764,498 A * | 6/1998 | Sundstrom | | 361/809 |
| 5,861,549 A * | 1/1999 | Neukermans et al. | | 310/333 |
| 5,947,880 A * | 9/1999 | Stagnitto et al. | | 483/58 |
| 5,975,510 A * | 11/1999 | Miyazaki | | 267/140.15 |
| 6,243,474 B1 | 6/2001 | Tai et al. | | 381/174 |
| 6,272,907 B1 * | 8/2001 | Neukermans et al. | | 73/105 |
| 6,283,701 B1 * | 9/2001 | Sundar et al. | | 414/744.5 |
| 6,467,761 B1 * | 10/2002 | Amatucci et al. | | 269/58 |
| 6,473,985 B2 * | 11/2002 | Won et al. | | 33/644 |
| 6,575,444 B1 * | 6/2003 | Bidaud | | 269/91 |
| 6,585,445 B1 * | 7/2003 | Goldfarb et al. | | 403/344 |
| 6,597,435 B2 * | 7/2003 | Poon et al. | | 355/75 |
| 6,685,422 B2 * | 2/2004 | Sundar et al. | | 414/744.5 |
| 6,695,297 B2 * | 2/2004 | Hoen et al. | | 267/160 |
| 6,720,551 B2 * | 4/2004 | Cleveland et al. | | 250/234 |
| 6,788,386 B2 * | 9/2004 | Cox et al. | | 355/53 |
| 6,794,660 B2 * | 9/2004 | Watson | | 250/492.2 |
| 6,806,593 B2 * | 10/2004 | Tai et al. | | 307/400 |
| 6,817,104 B2 * | 11/2004 | Kaneko et al. | | 33/1 M |
| 6,845,974 B2 * | 1/2005 | Bidaud | | 269/91 |
| 6,947,125 B2 * | 9/2005 | del Puerto | | 355/75 |
| 7,075,623 B2 * | 7/2006 | Galburt et al. | | 355/72 |
| 7,093,827 B2 * | 8/2006 | Culpepper | | 267/160 |
| 7,098,572 B2 * | 8/2006 | Choi et al. | | 310/311 |
| 7,153,198 B2 * | 12/2006 | Fujii et al. | | 451/41 |
| 7,222,411 B1 * | 5/2007 | McGrath | | 29/603.03 |
| 7,239,107 B1 * | 7/2007 | Ferreira et al. | | 318/649 |
| 7,266,272 B1 * | 9/2007 | Calvet et al. | | 385/52 |
| 7,270,319 B2 * | 9/2007 | Culpepper | | 267/160 |
| 7,288,861 B1 * | 10/2007 | Willard et al. | | 310/15 |
| 7,387,508 B2 * | 6/2008 | Choi et al. | | 425/385 |
| 7,432,634 B2 * | 10/2008 | Choi et al. | | 310/323.17 |
| 7,435,032 B1 * | 10/2008 | Murphey et al. | | 403/220 |
| 7,549,204 B1 * | 6/2009 | Vangal-Ramamurthy et al. | | 29/407.02 |
| 7,550,880 B1 * | 6/2009 | Pusl | | 310/15 |
| 7,555,210 B2 * | 6/2009 | Calvet | | 396/79 |
| 7,646,969 B2 * | 1/2010 | Calvet et al. | | 396/79 |
| 7,729,802 B2 * | 6/2010 | Murray et al. | | 700/245 |
| 7,895,733 B2 * | 3/2011 | Ishibashi et al. | | 29/709 |
| 7,896,623 B2 * | 3/2011 | Hell et al. | | 417/363 |
| 8,014,662 B1 * | 9/2011 | Gutierrez et al. | | 396/133 |
| 8,016,277 B2 * | 9/2011 | Choi et al. | | 269/58 |
| 8,129,870 B1 * | 3/2012 | Pusl | | 310/15 |
| 8,443,526 B2 * | 5/2013 | Weiss | | 33/645 |
| 8,605,375 B2 * | 12/2013 | Gutierrez et al. | | 359/824 |
| 8,608,393 B2 * | 12/2013 | Gutierrez et al. | | 396/529 |
| 8,616,791 B2 * | 12/2013 | Calvet et al. | | 396/529 |
| 8,619,378 B2 * | 12/2013 | Gutierrez | | 359/822 |
| 8,628,377 B2 * | 1/2014 | Goldsmith et al. | | 451/11 |
| 8,637,961 B2 * | 1/2014 | Gutierrez et al. | | 257/620 |
| 8,661,929 B2 * | 3/2014 | Choi et al. | | 74/490.05 |
| 2001/0004420 A1 * | 6/2001 | Kuwana et al. | | 396/55 |
| 2001/0033670 A1 * | 10/2001 | Tai et al. | | 381/174 |
| 2001/0049959 A1 * | 12/2001 | Neukermans et al. | | 73/104 |
| 2002/0051704 A1 * | 5/2002 | Sundar et al. | | 414/744.5 |
| 2002/0170360 A1 * | 11/2002 | Anand et al. | | 73/849 |
| 2002/0184952 A1 * | 12/2002 | Leist et al. | | 73/662 |
| 2003/0117934 A1 * | 6/2003 | Mori et al. | | 369/244 |
| 2004/0160585 A1 * | 8/2004 | Jacobs et al. | | 355/53 |
| 2005/0103967 A1 * | 5/2005 | Galburt et al. | | 248/346.06 |
| 2006/0192858 A1 * | 8/2006 | Calvet | | 348/208.7 |
| 2006/0193618 A1 * | 8/2006 | Calvet | | 396/79 |
| 2006/0233069 A1 * | 10/2006 | Mori et al. | | 369/44.15 |
| 2007/0017300 A1 * | 1/2007 | Bushey et al. | | 73/856 |
| 2009/0037004 A1 * | 2/2009 | Choi et al. | | 700/61 |
| 2011/0037488 A1 * | 2/2011 | Shilpiekandula et al. | | 324/690 |

* cited by examiner

FLEXURE BASED COMPLIANCE DEVICE FOR USE WITH AN ASSEMBLY DEVICE

BACKGROUND

During the manufacturing of devices (e.g., mechanical, electromechanical, and electrical devices), an assembly device is often utilized to place a component into a pre-designated position (e.g., such as in a mounting opening) and/or to drive a component (e.g., such as a fastener) into the device being assembled in order to connect together components of the device. Example of fasteners may include: screws, plugs, bolts, rivets, etc.; which are used to connect together components of the device being manufactured. Fastener drivers (e.g., such as automated screw drivers) are often used in large volume device manufacturing. In particular, fastener drivers are commonly used in high-tech device manufacturing.

Due to the complexity of high-tech devices and the cost competiveness of the high-tech industry, the components of high-tech devices need to be assembled in a very precise and cost effective manner. Examples of high-tech devices include: storage devices, disk drives, computing devices, personal computers, laptop computers, server computers, mobile computers, mobile devices, wireless devices, etc. In order to be cost effective, complex components need to be assembled, with fasteners, such as screws, in a very time effective manner with a very low error rate—even though many of the components require highly precise assembly. Also, many of these types of components often need to be assembled in a clean room environment in which debris and contamination particles are kept to a minimum.

In particular, highly accurate assembly techniques are desired in high-tech manufacturing operations due to very taut locations and openings in assembly operations, which are very prone to assembly error. In particular, highly accurate assembly techniques are desired to reduce the scraping of components and to reduce damage to both fastener components (e.g., screws) and to contact points. Unfortunately, these types of damages may cause contamination in the assembly of the device and may result in the failure of the device in operation.

DETAILED DESCRIPTION

Figure 1A:
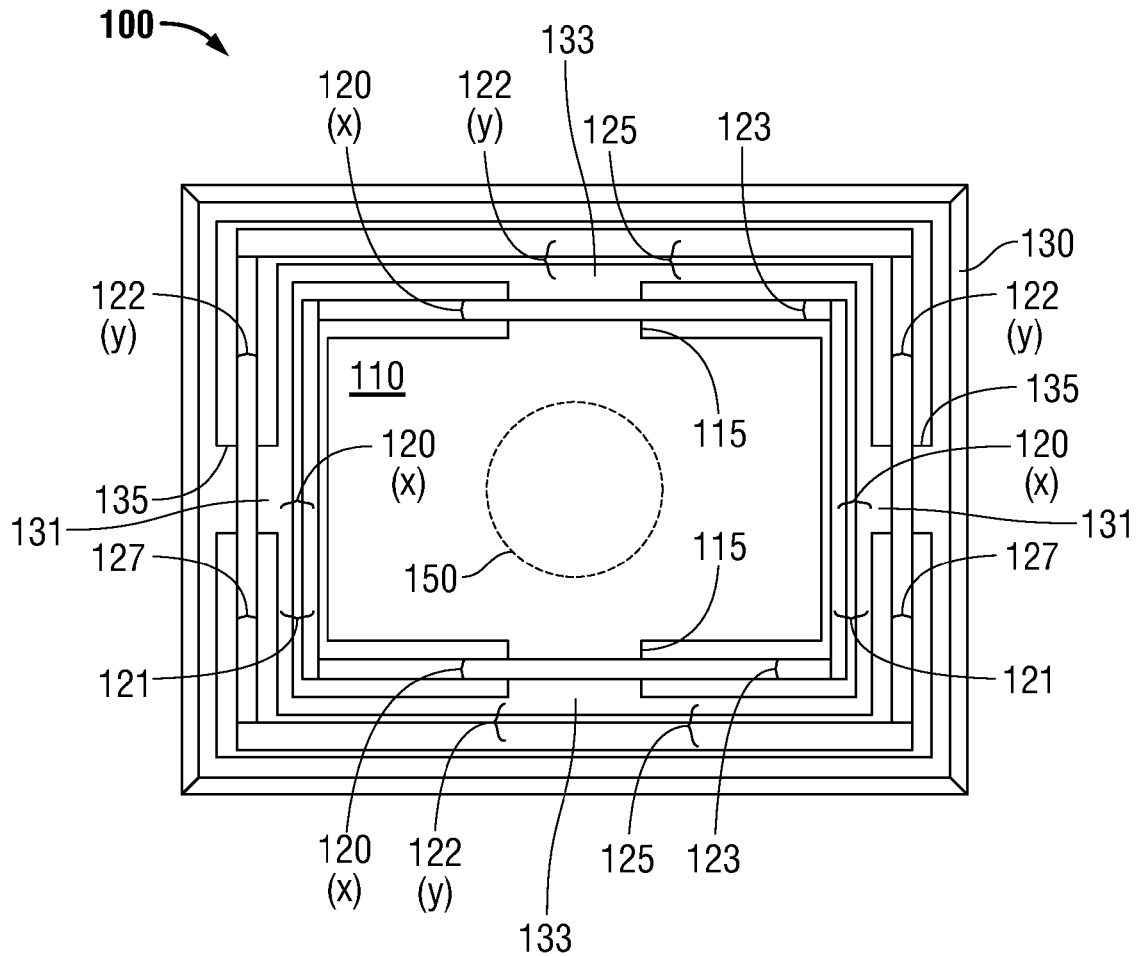
FIG. 1A is a top view of a flexure based compliance device, according to one embodiment of the invention.
Figure 1B:
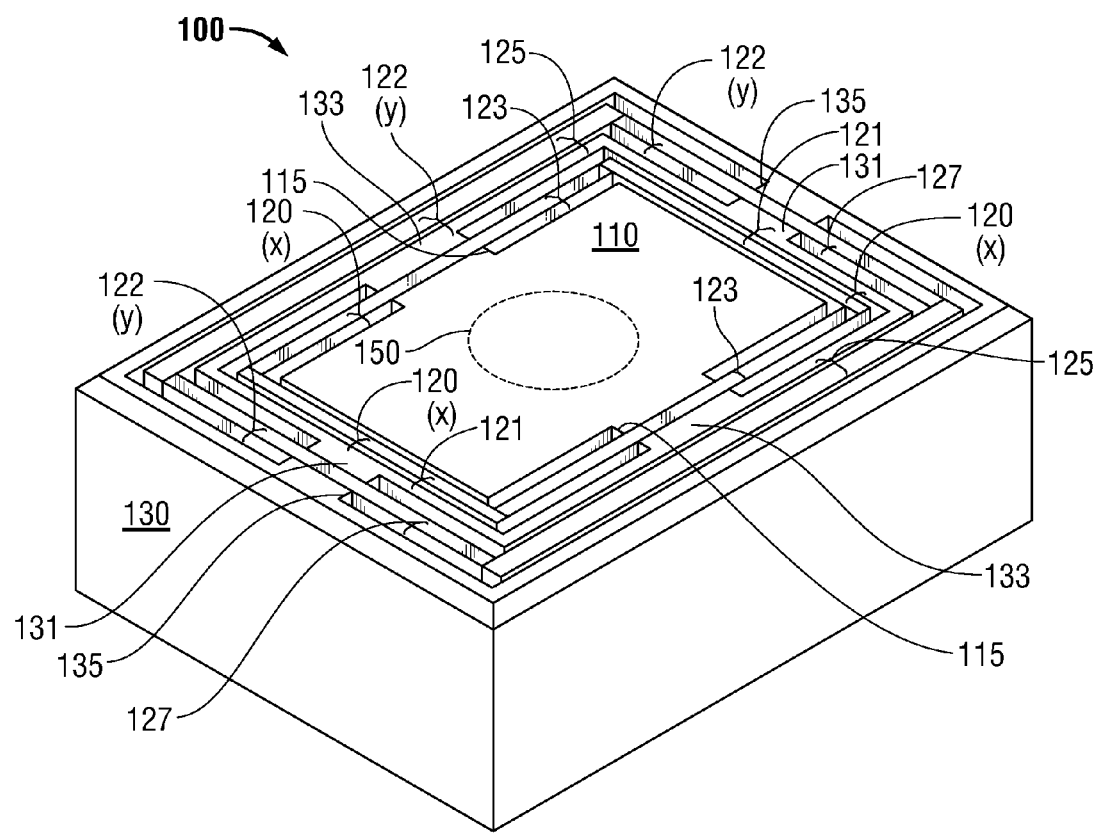
FIG. 1B is a perspective view of the flexure based compliance device, according to one embodiment of the invention.
Figure 1C:
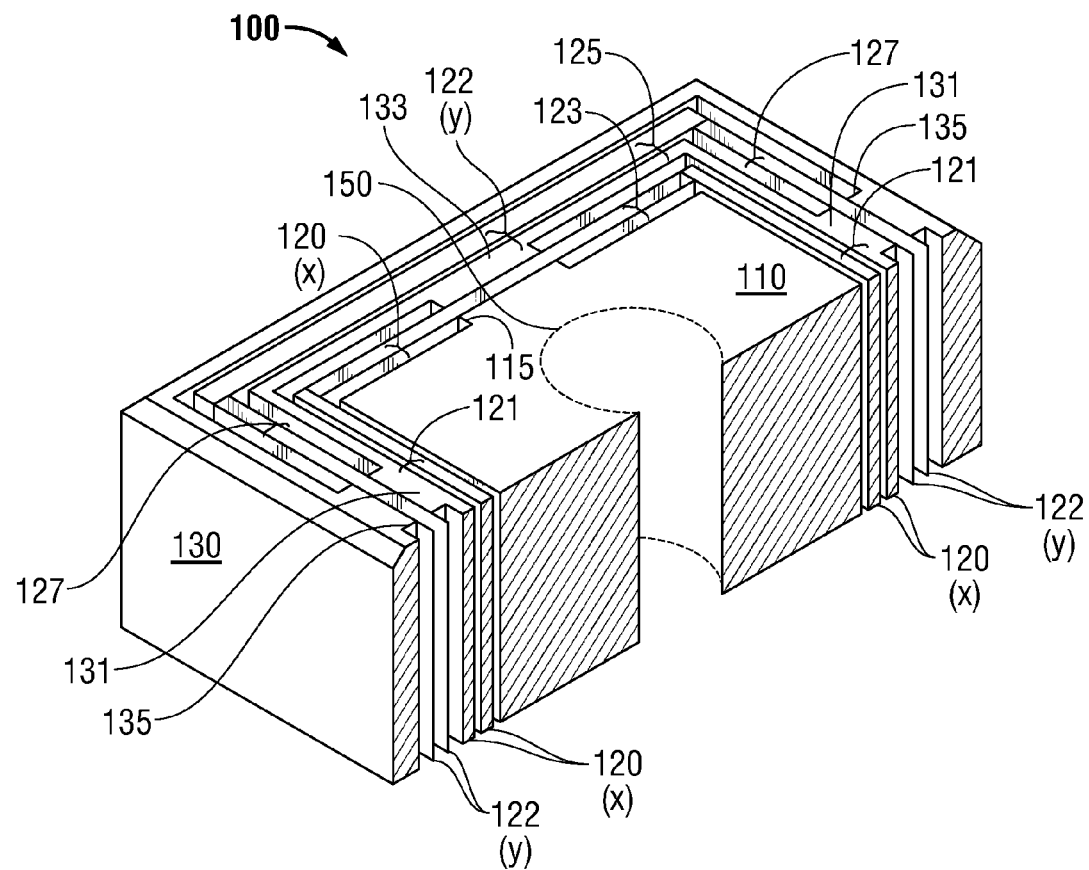
FIG. 1C is a perspective cross-sectional view of the flexure based compliance device, according to one embodiment of the invention.

With reference to FIGS. 1A-1C, a flexure based compliance device 100, according to one embodiment of the invention, is shown. The flexure based compliance device 100 may be used with an assembly device in an assembly process to assemble a device, as will be described in more detail hereinafter. In particular, the flexure based compliance device 100 may be used in conjunction with an assembly device in an assembly process to assemble a device in which the flexure based compliance device 100 provides both axial and translational compliance to the assembly device to provide better alignment in the assembly process and to reduce contamination.

In one embodiment, the flexure based compliance device 100 includes a coupling section 110 that is configured for coupling to an assembly device. The flexure based compliance device 100 further includes a pair of double compound rectilinear flexures 120 and 122 that are configured for coupling to the coupling section 110. As will be described, the pair of double compound rectilinear flexures 120 and 122 may provide both axial and translational compliance to an assembly device in an assembly process.

To aid in the description of the flexure based compliance device 100, the interior rectilinear flexures 120 are denoted with an x [120(x)] in FIGS. 1A-1C and provide axial (hereinafter x-axis) compliance. On the other hand, the exterior rectilinear flexures 122 denoted with a y [122(y)] in FIGS. 1A-1C provide translational (hereinafter y-axis) compliance. In order to accomplish this, as can be seen in FIGS. 1A-1C, the interior rectilinear flexures 120 are connected to rectangular protruding portions 115 of the coupling section 110. The exterior rectilinear flexures 122 are connected to protruding rectangular portions 135 of an approximately rectangular-shaped outer housing 130 of the flexure based compliance device 100. The interior rectilinear flexures 120 include a pair of parallel and opposed wider sections 121 and a pair of parallel and opposed thinner sections 123. Likewise, the exterior rectilinear flexures 122 include a pair of parallel and opposed wider sections 125 and a pair of parallel and opposed thinner sections 127. Based upon this arrangement, the interior rectilinear flexures 120 and the exterior rectilinear flexures 122 are arranged approximately 90 degrees apart from one another.

As can be seen in FIGS. 1A-1C, a thinner section 123 of the interior rectilinear flexures 120 is connected to the protruding rectangular section 115 of the coupling section 110 and a thinner section 127 of the exterior rectilinear flexures 122 is connected to the rectangular protruding portions 135 of the housing 130 of the flexure based compliance device 100, and the interior rectilinear flexures 120 and the exterior rectilinear flexures 122 are interconnected to one another directly and through protruding rectangular sections 131 and 133. In this way, the interior rectilinear flexures 120 provide x-axis directional compliance to the coupling section 110 and the assembly device attached thereto and the exterior rectilinear flexures 122 provide y-axis directional compliance to the coupling section 110 and the assembly device attached thereto, as will be described.

The assembly device may be coupled or connected to the coupling section 110 of the flexure based compliance device 100 in a variety of different ways. In one embodiment, the coupling section 110 may include an opening 150 that may extend all the way through the coupling section 110 or only partially through the coupling section 110. The opening 150 may receive a mounting part of the assembly device to be mounted to the coupling section 110 of the flexure based compliance device 100. Although the opening 150 is shown as being approximately circular-shaped, it should be appreciated that any shape may be utilized. Further, it should be appreciated that an opening 150 may not be utilized for the mounting of an assembly device. Instead of the use of an opening, an assembly device may be mounted to the coupling section 110 by molding, fastening, welding, or any mounting method known to those of skill in the art.

As previously described, the interior rectilinear flexures 120 are coupled to the coupling section 110, the exterior rectilinear flexures 122 are coupled to the housing 130 of the flexure based compliance device 100, and the interior rectilinear flexures 120 and the exterior rectilinear flexures 122 are interconnected to one another, such that the interior and exterior rectilinear flexure 120 and 122 may provide both x-axis and y-axis directional compliance to an assembly device that is coupled to the coupling section 110 of the flexure based compliance device 100. Examples of how the flexure based compliance device 100 may be used in conjunction with an assembly device in an assembly process to assemble a device in which the flexure based compliance device 100 provides both x-directional and y-directional compliance to the assembly device to provide better alignment in the assembly process will be described in more detail hereinafter.

In one embodiment, the interior and exterior rectilinear flexures 120 and 122 may be formed from a stainless steel material. The use of stainless steel in the previously-described configuration of the interior and exterior rectilinear flexures 120 and 122 has been found to provide a sufficient spring constant in the x and y directions to provide sufficient alignment forces for assembly devices. As one particular example, a 17-4 PH SST has been found to provide a proper spring constant. However, it should be appreciated that any material that provides a sufficient spring constant and a proper elastic limit may be utilized.

Further, in one embodiment, the interior and exterior rectilinear flexure 120 and 122 may be formed by electro-discharge machining (EDM). However, it should be appreciated that a wide variety of techniques may be utilized to form the flexure based compliance device 100 including the coupling section 110 and the interior and exterior rectilinear flexures 120 and 122—such as laser cutting or other types of machine cutting. Also, in the previously-described example, 12 different EDM cuts were made to form the interior and exterior rectilinear flexures 120 and 122 for use in the flexure based compliance device 100.

It should be appreciated by those of skill in the art that the configurations, shapes, number of cuts, and materials of the interior and exterior rectilinear flexures 120 and 122 that provide both x-axis and y-axis directional compliance are just examples and that a wide variety of different types of configurations, shapes, number of cuts, and materials may be utilized.

With additional reference to FIGS. 2A-2C, examples of how the flexure based compliance device 100 may be used with an assembly device 200 in an assembly process to assemble a device will be described. As can be seen in this example, an arm 209 may be coupled to the flexure based compliance device 100. Flexure based compliance device 100 includes the interior and exterior rectilinear flexures 120 and 122 and the coupling section 110, as previously described. Arm 209 may be coupled to the housing 130 of the flexure based compliance device 100 by suitable means such as the fasteners, molding, welding, etc. Arm 209 may be a robotic arm or a manually controlled arm.

Further, assembly device 200 may be mounted to the coupling section 110 of the compliance device 100 by suitable means such as fasteners, molding, welding, etc. For example, as previously described, the assembly device 200 may be mounted to a pre-existing opening 150 of the coupling section 110. In this example, assembly device 200 may be a gripper 200. As an example, a portion of the gripper (not shown) may be mounted within the pre-existing opening 150 of the coupling section 110. However, any pick and place assembly device (e.g., suction devices, magnetic devices, mechanical placement devices, etc.) or any type of assembly or driver device (e.g., automatic screw driver, rivet driver, etc.) may be utilized. Further, it should be appreciated that component 204 may be a component of the device itself or may be a fastener component (e.g., screws, plugs, bolts, rivets) in order to connect together components of the device.

In one embodiment, the flexure based compliance device 100 is sandwiched between the arm 209 and the gripper 200, and the gripper 200 is connected to the coupling section 110, such that the interior and exterior rectilinear flexures 120 and 122 provide both x-axis and y-axis directional compliance to the gripper 200 in the assembly process, as will be described.

Proceeding with this example, gripper 200 may include gripper fingers 202 that are used to pick and place component 204 into an opening 210 of a part 212 of the device to be manufactured. As will be described, as often occurs in placing a component 204 into an opening 210 of a part 212 of a device to be assembled, there is often misalignment between the component 204 and the opening 210. This may cause damage to both the component 204 and the opening 210 and part 212 of the device being assembled. As can be seen in FIG. 2A, the component 204 is misaligned with the opening 210 of the part 212 of the device being assembled as the gripper 200 is being moved down towards the opening 210. In particular, there is both a cocking misalignment and a lateral misalignment.

Figure 2A:
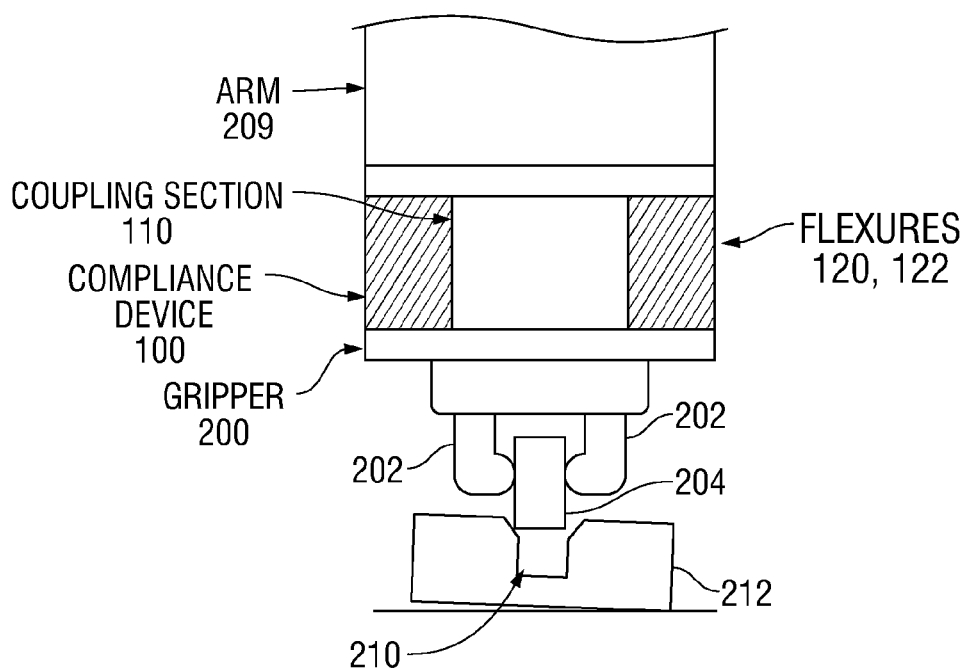
FIGS. 2A-2C show diagrams of the flexure based compliance device coupled to a gripper and arm as used in an assembly process to place a component into an opening, according to one embodiment of the invention.
Figure 2B:
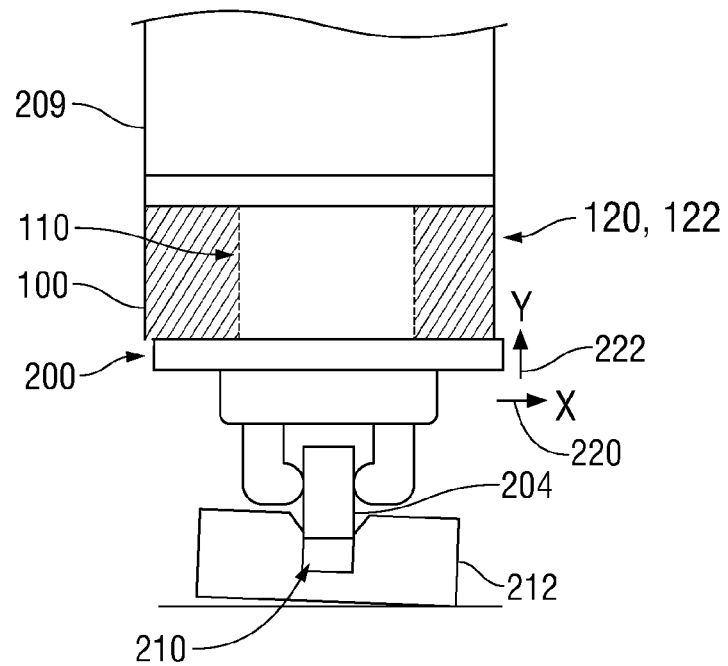

With additional reference to FIG. 2B, as the component 204 is being placed into opening 210, the interior and the exterior rectilinear flexures 120, 122 provide both x-axis and y-axis directional compliance to the gripper 200 in placing component 204 into opening 210. As can be seen in FIG. 2B, x-axis directional compliance 220 is provided by the interior and the exterior rectilinear flexures 120, 122 as the coupling section 110 and the gripper 200 are moved along the x-axis 220 (to the right), as opposed to the arm 209 and the compliance device 100 itself which remain fixed, in order to compensate for the misalignment of the component 204 and the opening 210 of the part 212 of the device to be assembled. Further, although not particularly shown, in the same way, the interior and exterior rectilinear flexures 120, 122 further may provide y-axis directional compliance 222 to gripper 220 in placing component 204 into the opening 210 of the part 212 of the device being assembled.

Figure 2C:
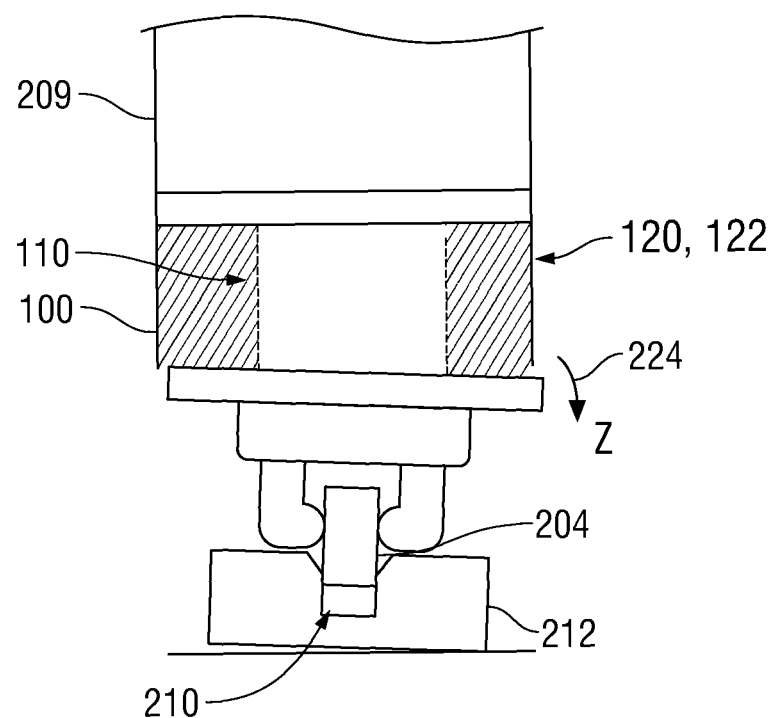

Moreover, with additional reference to FIG. 2C, as component 204 is placed into the opening 210 of the part 212 of the device being assembled, the interior and exterior rectilinear flexures 120, 122 may further provide compliance in the rotational z-axis 224 in placing the component 204 into opening 210. As can be seen in FIG. 2C, z-axis rotational compliance 224 may be provided by the interior and the exterior rectilinear flexures 120, 122 as the coupling section 110 and the gripper 200 are slightly rotated along the z-axis 220, as opposed to the arm 209 and the compliance device 100 itself which remain fixed, in order to compensate for the misalignment of the component 204 and the opening 210 of the part 212 of the device to be assembled.

Therefore, as previously described, the interior and exterior rectilinear flexures 120, 122 of the flexure based compliance device 100 provide x-axis, y-axis, and z-axis 220, 222, and 224 compliance for the assembly device 200, as opposed to the arm 209 and the compliance device 100 itself which remain fixed, in order to compensate for the misalignment of the component 204 and the opening 210 of the part 212 of the device to be assembled such that damage to the component 204 and the device being manufactured is reduced.

Figure 3:
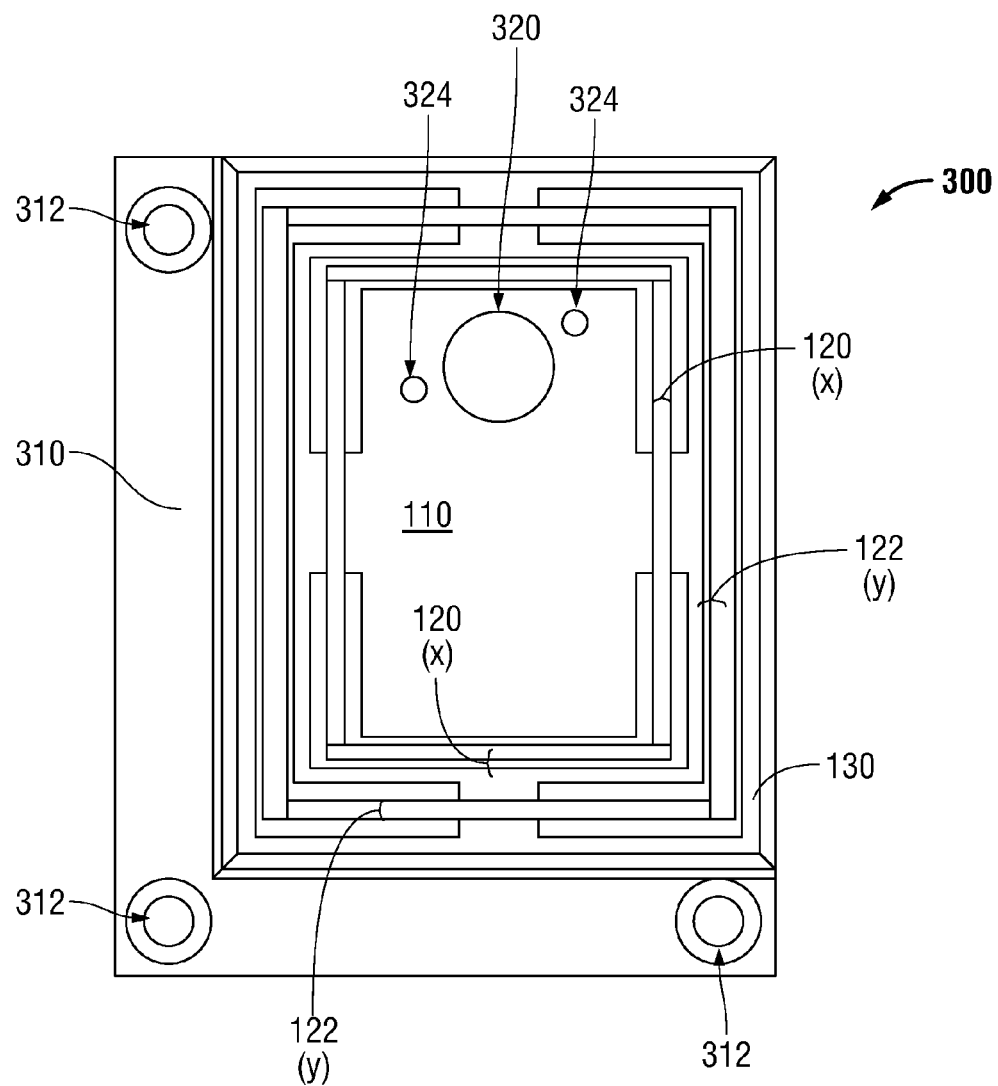
FIG. 3 is a top view of a flexure based compliance device including an opening for the receipt of a driver, according to one embodiment of the invention.

With additional reference to FIG. 3, another embodiment of the flexure based compliance device 300 is shown, according to one embodiment of the invention. The flexure based compliance device 300 of this embodiment is basically the same as the previously-described flexure based compliance device 100 in which it similarly comprises a coupling section 110 and a pair of double compound rectilinear flexures including interior and exterior rectilinear flexures 120 and 122. The interior and exterior rectilinear flexures 120 and 122 are coupled to the coupling section 110, the housing 130 of the flexure based compliance device 300, and each other, in order to provide both axial (x-axis) and translational (y-axis) directional compliance to an assembly device in the assembly process, as previously described in detail. Therefore, for brevity's sake, the particulars of the interior and exterior rectilinear flexures 120 and 122 and the coupling section 100 will not be repeated, as they have been previously described in detail.

However, in this embodiment, attached to the housing 130 of the flexure based compliance device 300 is an L-shaped mounting section 310 having mounting openings 312 for mounting the flexure based compliance device 300 to assembly devices. Further, in this embodiment, the flexure based compliance device 300 is utilized with an assembly device that includes a driver to drive a fastener in which the driver is driven through an opening 320 of the coupling section 110 such that the interior and exterior rectilinear flexures 120 and 122 provide both x-axis and y-axis directional compliance to the driver as it is driven through the opening 320 of the coupling section 110 in driving a fastener to a component of the device being assembled.

Figure 4:
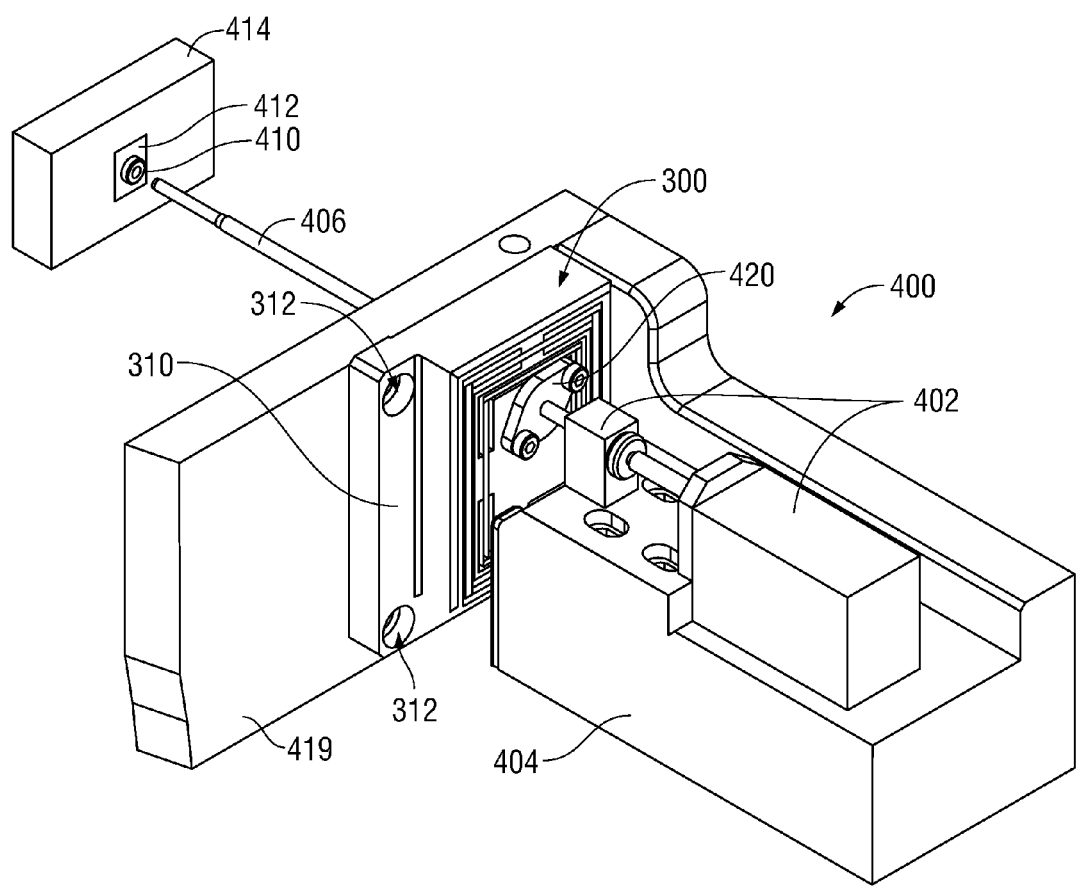
FIG. 4 is a perspective view of a driver extending through the opening of the flexure based compliance device as used in an assembly process to fasten a fastener to a device, according to one embodiment of the invention.

With additional reference to FIG. 4, FIG. 4 shows a driver station 400 that includes a driver mechanism 402 mounted to a driver base 404 that drives a driver 406 to drive a fastener 410 into a component 412 of a device 414 to be assembled. In this example, the driver station 400 includes a wall 419 to which the flexure based compliance device 300 is mounted via appropriate fasteners through mounting holes 312 of mounting wall 310. Further, an approximately oval-shaped fixture 420 may be mounted to openings 324 of the coupling section 110 of the flexure based compliance device 300 via suitable fasteners. The fixture 420 includes a suitably-sized opening to receive driver 406 such that driver 406 extends through opening 320 of coupling section 110 of the flexure based compliance device 300.

In this embodiment, the assembly device may be a driver 406 to drive a fastener 410 into a component 412 of a device 414 to be assembled. The driver 406 is driven through the opening 320 of the coupling section 110 of the flexure based compliance device 300 such that the interior and exterior rectilinear flexures 120 and 122 provide both x-axis and y-axis directional compliance to the driver 406 when the driver 406 mates with the fastener 410 and drives the fastener 410 into the component 412 and the device 414 being connected.

In particular, the flexure based compliance device 300 operates with driver 406 in a similar manner to the gripper 200 previously described with the reference FIGS. 2A-2C, in which, the interior and exterior rectilinear flexures 120 and 122 coupled to the coupling section 110 provide x-axis, y-axis and z-axis directional compliance to the gripper 200 in the assembly process in placing a component into an opening. However, in this example, the interior and exterior rectilinear flexures 120 and 122 connected to the coupling section 100 of flexure based compliance device 300 provide directional compliance in the x, y, and z axes to driver 406 when driver 406 mates with fastener 410 and drives fastener 410 into component 412 and device 414 to connect component 412 and device 414. In this way, the flexure based compliance device 300 compensates for misalignment between the head of the driver 406 and the receiving section of the fastener 410.

It should be appreciated, that the driver 406 may be any type of driver device (e.g., automatic screw driver, rivet driver, etc.) and the device 414 to be assembled may be any type of device. As one example, device 414 to be assembled may be a hard disk drive (HDD), in which the components of the HDD may be assembled utilizing a fastener driver 406. A HDD typically includes a head disk assembly (HDA) including at least one magnetic disk, a disk clamp and a disk fastener to mount the disk to a spindle motor that rapidly rotates the disk, and a head stack assembly (HSA) that includes a moveable actuator arm and a head gimbal assembly (HGA) with a moveable transducer head for reading and writing data from and to the disk. During the manufacturing of a disk drive, a fastener driver 406 (e.g., an automatic screw driver) may be utilized to attach components together of the disk drive being manufactured, such as, latches, ramps, disks, spindle motors, disk clamps, actuator arms, and various other HDA, HSA, and HGA components, utilizing fasteners 410 (e.g., screws). Other fasteners may also be utilized. For example, a head stack boss driven by driver 406, in conjunction with flexure based compliance device 300, may be properly aligned with mounting holes of the actuator arm to mount an HGA.

Although a gripper 200 and a driver 406 have been previously provided as examples of assembly devices that may be utilized with embodiments of the invention related to a flexure based compliance device, it should be appreciated that a wide variety of different assembly devices may be utilized in conjunction with the flexure based compliance device. For example, pick and place assembly devices (e.g., suction devices, magnetic devices, mechanical placement devices, etc.) or any type of assembly or driver device (e.g., automatic screw driver, rivet driver, etc.) may be utilized. Further, it should be appreciated that a wide variety of fasteners such as screws, rivets, plugs, bolts, or any type of component, in a manufacturing process, may be utilized with embodiments of the invention to assemble a device.

By utilizing the previously described active aligning double compound rectilinear flexure compliant devices 100 and 300 in conjunction with assembly devices 200 and 400 such as, pick and place devices and drivers, a more efficient process of manufacturing and assembly devices is provided. The double compound rectilinear flexure compliant device 100 or 300 used with an assembly device enables highly accurate assembly techniques that are desired in high-tech manufacturing operations that have very taut locations and openings, which are very prone to assembly error. These highly accurate assembly techniques enhanced by the double compound rectilinear flexure compliant device 100 or 300 reduces the scraping of components and reduces damage to both fastener components (e.g., screws) and to contact points of the device being assembled. Further, contamination caused by these damages in the assembly of the device is reduced.

By utilizing embodiments of the invention, placing and driving components and fasteners into very taut openings can be done with minimized scraping, stripping of fastener heads, and damage to contact points of the device during the assembly process which reduces damage to the device being manufactured as well as contamination in the device being manufactured. This is especially critical in high-technology devices, such as, disk drives. In these types of devices, component damage or contamination may result in the failure of the device being manufactured.

Further, embodiments of the invention may significantly reduce and/or compensate for errors by either a manual operator or a robotic device in placing and/or driving components during the assembly process. As an example, when utilizing screw fasteners, the flexure based compliance device may significantly reduce screw fastening damage and significantly increase device yield. Utilization of embodiments of the invention may significantly reduce damages due to misalignment such as stripping, scrapping, and denting components of the device being manufactured. Thus, embodiments of the invention may provide many benefits including: reducing potential contamination, increasing the yield of manufactured devices, reducing manufacturing down time because of misaligned picked and placed components and damaged components due to misalignment in driving fasteners. Accordingly, the previously described embodiments of the invention provide many benefits in the assembly of devices.

While embodiments of the invention and their various mechanical, electromechanical, electrical, and functional components have been described in particular embodiments, it should be appreciated that the embodiments can be implemented with a wide variety of differing mechanical, electromechanical, electrical, and functional components, and combinations thereof. Further, although particular embodiments have been described as being employed for use with a gripper and driver, the embodiments of the invention may be implemented with numerous other types of manufacturing devices and manufacturing processes to manufacture a wide variety of different types of devices.

What is claimed is:

1. A flexure based compliance device for use with an assembly device in an assembly process to assemble a device, the flexure based compliance device comprising:
    a coupling section configured for coupling to the assembly device; and
    a pair of double compound rectilinear flexures configured for coupling to the coupling section, the pair of double compound rectilinear flexures comprising interior rectilinear flexures and exterior rectilinear flexures, the interior and exterior rectilinear flexures being directly connected to each other and each of the interior and exterior rectilinear flexures comprising a pair of parallel and opposed wider sections and a pair of parallel and opposed thinner sections configured to provide a sufficient spring constant and proper elasticity to provide axial, translational, and rotational compliance to the assembly device in the assembly process.

2. The flexure based compliance device of claim 1, wherein, the pair of double compound rectilinear flexures are approximately 90 degrees apart from one another.

3. The flexure based compliance device of claim 1, wherein, the pair of double compound rectilinear flexures comprise stainless steel.

4. The flexure based compliance device of claim 3, wherein, the stainless steel is formed to provide the spring constant.

5. The flexure based compliance device of claim 1, wherein, the pair of double compound rectilinear flexures are created by electro-discharge machining.

6. The flexure based compliance device of claim 1, wherein, when, the assembly device is a gripper to pick and place a component, the gripper is coupled to the coupling section such that the pair of double compound rectilinear flexures provide both axial and translational compliance to the gripper in picking and placing components.

7. The flexure based compliance device of claim 1, wherein, the coupling section further comprises an opening.

8. The flexure based compliance device of claim 7, wherein, when, the assembly device is a driver to drive a fastener, the driver is driven is through the opening of the coupling section such that the pair of double compound rectilinear flexures provide both axial and translational compliance to the driver in driving the fastener.

9. The flexure based compliance device of claim 1, wherein, the device to be assembled is a disk drive.

10. A method for using a flexure based compliance device with an assembly device in an assembly process to assemble a device, the method comprising:
    coupling the assembly device to a coupling section of the flexure based compliance device, wherein a pair of double compound rectilinear flexures are coupled to the coupling section, the pair of double compound rectilinear flexures comprising interior rectilinear flexures and exterior rectilinear flexures, the interior and exterior rectilinear flexures being directly connected to each other and each of the interior and exterior rectilinear flexures comprising a pair of parallel and opposed wider sections and a pair of parallel and opposed thinner sections configured to provide a sufficient spring constant and proper elasticity to provide axial, translational, and rotational compliance to the assembly device in the assembly process.

11. The method of claim 10, wherein, the pair of double compound rectilinear flexures are approximately 90 degrees apart from one another.

12. The method of claim 10, wherein, the pair of double compound rectilinear flexures comprise stainless steel.

13. The method of claim 12, wherein, the stainless steel is formed to provide the spring constant.

14. The method of claim 10, wherein, the pair of double compound rectilinear flexures are created by electro-discharge machining.

15. The method of claim 10, wherein, when, the assembly device is a gripper to pick and place a component, further comprising, coupling the gripper to the coupling section such that the pair of double compound rectilinear flexures provide both axial and translational compliance to the gripper in picking and placing components.

16. The method of claim 10, wherein, the coupling section further comprises an opening.

17. The method of claim 16, wherein, when, the assembly device is a driver to drive a fastener, further comprising, driving the driver through the opening of the coupling section such that the pair of double compound rectilinear flexures provide both axial and translational compliance to the driver in driving the fastener.

18. The method of claim 10, wherein, the device to be assembled is a disk drive.

* * * * *